United States Patent [19]

Köhler et al.

[11] Patent Number: 5,137,938
[45] Date of Patent: Aug. 11, 1992

[54] MIXTURE OF POLYARYLENE SULPHIDES, GLASS FIBRES AND MALEIMIDES

[75] Inventors: Burkhard Köhler; Wilfried Cramer, both of Krefeld, Fed. Rep. of Germany; Hans-Joachim Traenckner, Merksem, Belgium; Harald Pielartzik, Krefeld, Fed. Rep. of Germany; Wolfgang Wehnert, Krefeld, Fed. Rep. of Germany; William C. Bushong, Krefeld, Fed. Rep. of Germany; Wolfgang Jakob, Moers, Fed. Rep. of Germany

[73] Assignee: Bayer Aktiengesellschaft, Leverkusen, Fed. Rep. of Germany

[21] Appl. No.: 830,473

[22] Filed: Feb. 3, 1992

Related U.S. Application Data

[63] Continuation of Ser. No. 510,893, Apr. 18, 1990, abandoned.

[30] Foreign Application Priority Data

Apr. 27, 1989 [DE] Fed. Rep. of Germany ....... 3913858
May 11, 1989 [DE] Fed. Rep. of Germany ....... 3915425

[51] Int. Cl.⁵ .................... 524K 105; 524K 109
[52] U.S. Cl. ...................... 523/209; 525/537
[58] Field of Search ............ 523/209; 525/537; 524/105

[56] References Cited

U.S. PATENT DOCUMENTS

| 4,497,928 | 2/1985 | Dean | 525/189 |
| 4,902,778 | 2/1990 | Boyd et al. | 525/421 |
| 4,923,928 | 5/1990 | Boyd et al. | 525/117 |
| 4,929,665 | 5/1990 | Inoue et al. | 524/500 |
| 4,968,762 | 11/1990 | Yamaya et al. | 526/262 |
| 5,003,018 | 3/1991 | Repecka | 525/537 |

FOREIGN PATENT DOCUMENTS

| 0134252 | 3/1985 | European Pat. Off. . |
| 0137427 | 4/1985 | European Pat. Off. . |
| 0275991 | 7/1988 | European Pat. Off. . |

OTHER PUBLICATIONS

Patent Abstracts of Japan; 12:496(C-555) [3343]; (1988); & JP-A063 205 358.
Patent Abstracts of Japan; 12:496(C-555) [3343]; (1988); & JP-A-63 205 357.
Patent Abstracts of Japan; 13:532(C-659) [3880]; (1989); & JP-A-1 217 063.

Primary Examiner—Melvyn I. Marquis
Assistant Examiner—Helen F. Lee
Attorney, Agent, or Firm—Connolly & Hutz

[57] ABSTRACT

The invention relates to mixtures of polyarylene sulphides, maleimides, glass fibres and if appropriate other additives. The mixtures are distinguished by good mechanical properties.

2 Claims, No Drawings

MIXTURE OF POLYARYLENE SULPHIDES, GLASS FIBRES AND MALEIMIDES

This application is a continuation of application Ser. No. 510,893, filed Apr. 18, 1990, now abandoned.

The invention relates to mixtures of polyarylene sulphides, maleimides, glass fibres and if appropriate other additives. The mixtures are distinguished by good mechanical properties.

Polyarylene sulphides (PAS) are known (e.g. U.S. Pat. No. 3,354,129 and EP-A 171 021). They are inert thermoplastics which have a high temperature resistance and allow a high degree of filling, e.g. with glass fibres and/or other inorganic fillers. The use of these polymers, in particular of polyphenylene sulphide (PPS), is increasing in areas hitherto reserved for thermosets.

PPS has mechanical properties which are inadequate for some uses, e.g. in the injection moulding field. In particular, the flexural or tensile strength, outer fibre strain, impact strength and elasticity modulus are often inadequate in practice. It has therefore proved to be advantageous to improve PPS in the properties mentioned e.g. by blending with other thermoplastics, e.g. with polycarbonates (e.g. JP-A 51-59952, EP-A 104 543 and U.S. Pat. No. 4,021,596).

For certain fields of use, however, the profile of properties of such blends is not always completely satisfactory.

It is known that PPS can be modified in its properties by blending with maleimides. Branching of PPS is usually effected here, since e.g. PPS is reacted with maleimides under oxidative conditions (JP-A 021 876) or PPS is reacted with compounds which contain at least three maleimide groups and one triazine ring (e.g. JP-A 202 162 and EP-A 105 639).

It would therefore be desirable to increase the properties of unbranched polyarylene sulphide by such additives which do not have a crosslinking effect on the polymer.

It has now been found that blends of polyarylene sulphides (PAS), preferably of polyphenylene sulphide (PPS), with small amounts of maleimides, glass fibres and if appropriate other additives are particularly distinguished by their mechanical properties, e.g. toughness, flexural strength, outer fibre strain etc.

The invention thus relates to mixtures of

A) 99.5 to 93% by weight of unbranched polyarylene sulphides which are free from sulphone groups, preferably PPS, B) 0.5 to 7% by weight of a maleimide of the formula (I) and/or (II), preferably of the formula (I)

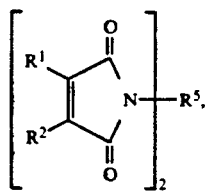

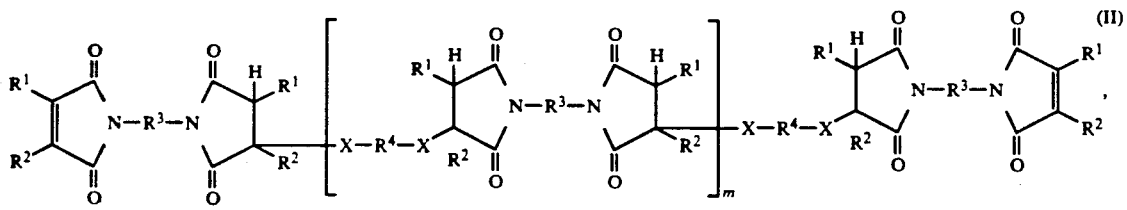

$R^1$ and $R^2$ can be identical or different and denote hydrogen, $C_1$-$C_{22}$-alkyl, preferably methyl, $C_6$-$C_{14}$-aryl, preferably phenyl, or $C_7$-$C_{22}$-aralkyl or $C_7$-$C_{22}$-alkylaryl, particularly preferably hydrogen, $R^3$, $R^4$ and $R^5$ independently of one another are divalent radicals with 1 to 38 aliphatic C atoms, which can optionally also be arranged in rings, and/or are divalent aromatic radicals with 6 to 24 C atoms and/or divalent aromatic-aliphatic and/or aliphatic-aromatic radicals with 7 to 40 C-atoms, it being possible for two or more aromatic or aliphatic rings to be optionally linked by a chemical bond $C_1$-$C_{10}$ alkylene group, an oxygen atom, a sulphur atom, a disulfide group, a carbonyl group and/or sulphone group, X represents —NH or $C_1$-$C_{10}$-N-alkyl, and m represents a number from 0 to 1,000, preferably 0 to 10, and C) based on 100 parts by weight of the sum of (A+B), 10–400, preferably 60–200 parts by weight of glass fibres which are sized with polyurthane film-forming agents and aminosilane adhesion promoters and/or other mineral fillers and reinforcing substances and/or inorganic or organic auxiliaries, wherein at least 30% by weight of the mineral fillers and reinforcing substances are glass fibres.

Examples of substances of the formula (I) according to the invention are 1,6-bis-(maleimido)-hexane, 1,4-bis-(maleimido)-hexane, 1,4-bis-(maleimido)-cyclohexane, 1,4-bis-(meleimido)-benzene, 4,4'-bis-(maleimido)-biphenyl, bis-(4-maleimidophenyl)-methane, 2,2-bis-(4-meleimidophenyl)-propane, 1,3-bis-(maleimido)-cyclohexane, 1,5-bis-(maleimido)-naphthalene, 1,3-bis-(maleimido)-benzene, bis-(maleimido)-methane, 1,2-bis-(maleimido)-ethane, di-(4-maleimidophenyl)-sulphone, di-(3-maleimidophenyl) sulphone, 4,4'-bis-(maleimido)-benzophenone, 3,3'-bis-(maleimido)-benzophenone, 4,4'-bis-(maleimido)-diphenylether, 4,4'-bis-(maleimido)-diphenyl sulphide, 4,4'-bis-(maleimido)-diphenyldisulfide.

Examples of substances of the formula (II) according to the invention are oligomeric or polymeric Michael addition products of bis-(4-maleimido)-methane with diamines, e.g. bis-(4-aminophenyl)methane or hexamethylene diamine etc.

The maleimides according to the invention can be prepared from maleic anhydride and amine, e.g. analogously to GB-A 1 137 592.

Mineral fillers or additives are e.g. mica, microtalc, talc, quartz(flour), metal oxides and sulphides, such as e.g. $TiO_2$, ZnO, ZnS, graphite, carbon black, fibres of e.g. quartz and carbon, carbonates, such as $MgCO_3$ and $CaO_3$, or sulphates, e.g. $CaSO_4$ and $BaSO_4$, glass fibres, glass beads etc.

Commercially available glass fibres, if appropriate sized in the customary manner, can be employed e.g. according to the invention. They have a diameter of 1 to 20 μm, preferably 1.5 to 10 μm. It is also possible to employ continuous fibres and/or to choose preparation processes in which the length of the fibres in the finished blend according to the invention is then 0.05 to 10, preferably 0.1 to 2 mm. Continuous fibres (rovings) can also be employed in processes for the production of a continuously reinforced unidirectional composite.

If appropriate, it is also possible to employ commercially available glass beads, e.g. Ballotini glass beads, instead of the glass fibres. These can also preferably be used as a mixture with glass fibres as further mineral fillers.

Further customary additives which can be employed are pigments, mould release agents, E waxes, flow auxiliaries, nucleating agents or stabilizers.

The mixtures according to the invention can be prepared by extrusion in the customary manner.

The mixtures according to the invention can be processed in the customary manner to give mouldings, semi-finished producs, fibres, films, profiles etc. The mixtures according to the invention can in general advantageously be employed where compositions which can be processed as thermoplastics are employed.

EXAMPLES

The preparation of the mixtures according to the invention was carried out on a ZSK 32 twin-screw extruder from Werner und Pfleiderer at 320° C.

The PPS used had a melt viscosity of 59 Pa.s (306° C.), Shear stress = 1,000 s$^{-1}$, and was prepared in accordance with EP-A 171 021.

The cut glass fibres Bayer CS 7916 ®, which are sized with polyurethane film-forming agents and aminosilane, were employed as the glass fibres to the extent of 40% by weight, together with 0.5% by weight of microtalc.

The mixtures were granulated and injection moulded to test bars (e.g. of dimensions 80×10×4 mm). These were investigated in respect of their flexural strength, outer fibre strain, flexural E modulus and impact strength $a_n$ (reversed notched ISO 180).

COMPARISON EXAMPLE 1

59.5% by weight PPS was mixed with the fillers.

COMPARISON EXAMPLE 2

58.5% by weight PPS and 1% polycarbonat M 3.200 ® were mixed with the fillers.

COMPARISON EXAMPLE 3

(not according to the invention)

54% by weight of PPS and 6% of bis-(4-maleinimidophenyl)-methane were mixed with the fillers. This comparison shows the poorer effect at greater concentrations of bis-(4-maleinimidophenyl)-methane.

COMPARISON EXAMPLE 4

(not according to the invention)

59% by weight of PPS and 1% of bis-(4-maleimidophenyl)methane were mixed with 40% of epoxysilane-sized glass-fibres OCF 429YZ ®. The comparison shows the effect of the adhesion promoter.

COMPARISON EXAMPLE 5

(not according to the invention)

59% by weight of PPS, 1% of bis-(4-maleimidophenyl)methane and 40% of the epoxysilane-sized glass fibres OCF R 44 CX1 ® were mixed. The comparison shows the effect of the adhesion promoter.

COMPARISON EXAMPLE 6

(not according to the invention)

59% by weight of PPS, 1% of bis-(4-maleimidophenyl)methane and 40% of glass fibres CS 7952 containing a polypropylene film-forming agent were mixed. The comparison shows the effect of the film-forming agent.

COMPARISON EXAMPLE 7

(not according to the invention)

59% by weight of PPS, 1% of 1,3,5-bis-(4-maleimidophenyl)-2,4,6-triazintrione and 40% of glass fibres CS 7916 ® were mixed. The comparison shows the poorer effect of trifunctional maleimides.

EXAMPLE 1

59% by weight PPS and 0.5% bis(4-maleimidophenyl)methane were mixed with the fillers.

EXAMPLE 2

58.5% by weight PPS and 1% bis(4-maleimidophenyl)methane were mixed with the fillers.

EXAMPLE 3

57.5% by weight PPS and 2% bis(4-maleimidophenyl)methane were mixed with the fillers.

| Example | Flexural strength MPa | Outer fibre strain % | E-Modulus MPa | Izod-impact strength kJ/m$^2$ |
|---|---|---|---|---|
| Comp. 1 | 249 | 1.86 | 13,060 | 28.5 |
| Comp. 2 | 284 | 2.16 | 12.970 | 38.3 |
| 1 | 307 | 2.45 | 12.490 | 45.9 |
| 2 | 314 | 2.49 | 12.660 | 49.4 |
| 3 | 318 | 2.48 | 13.470 | 49.9 |
| Comp. 3 | 286 | 2.45 | 11.960 | 34.7 |
| Comp. 4 | 280 | 2.16 | 12.800 | 40.5 |
| Comp. 5 | 297 | 2.31 | 13.071 | 39.7 |
| Comp. 6 | 224 | 1.61 | 14.032 | 23.7 |
| Comp. 7 | 279 | 2.29 | 12.790 | 33.3 |

We claim:
1. Mixtures consisting of
A) 99.5 to 93% by weight of unbranched polyarylene sulphide free from sulphone groups,
B) 0.5 to 7% by weight of a maleimide of the formula (I) or (II), or a mixture of (I) and (II)

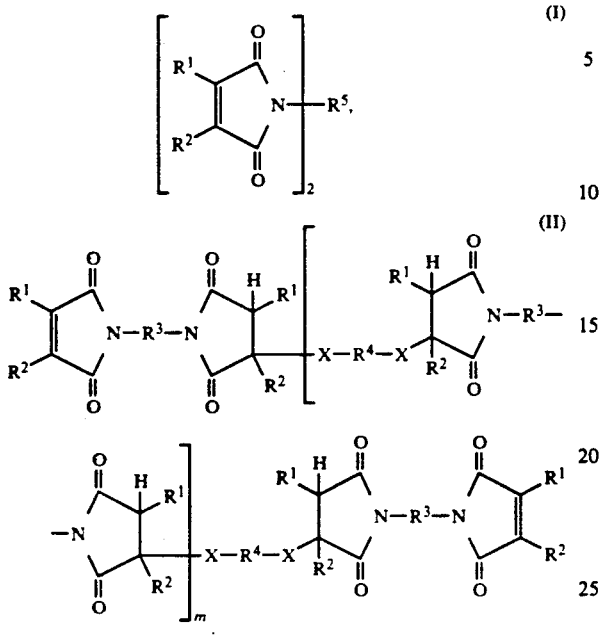

wherein
R¹ and R² can be identical or different and each denotes hydrogen, $C_1-C_{22}$-alkyl, $C_6-C_{14}$-aryl, or $C_7-C_{22}$-aralkyl or $C_7-C_{22}$-alkylaryl,
R³, R⁴ and R⁵ independently of one another are divalent radicals with 1 to 38 cyclic or acyclic aliphatic carbon atoms, divalent aromatic radicals with 6 to 24 carbon atoms, divalent aromatic-aliphatic or aliphatic-aromatic radicals with 7 to 40 carbon atoms, or at least two of R³, R⁴ and R⁵ being aromatic or aliphatic rings linked by a chemical bond, $C_1-C_{10}$-alkylene group, an oxygen atom, a sulphur atom, a disulfide group, a carbonyl group or a sulphone group,
X represents —NH or $C_1-C_{10}$-N-alkyl, and
m represents a number from 0 to 1,000, and
C) based on 100 parts by weight of the sum of (A+B), 10–400 parts by weight of glass fibers which are sized with polyurethane film-forming agents and aminosilane adhesion promoters or other mineral fillers, reinforcing substances or inorganic or organic auxiliaries, wherein at least 30% by weight of the fillers and reinforcing substances are glass fibers.

2. Shaped articles containing the mixture claimed in claim 1.

* * * * *